US008676498B2

United States Patent
Ma et al.

(10) Patent No.: US 8,676,498 B2
(45) Date of Patent: Mar. 18, 2014

(54) CAMERA AND INERTIAL MEASUREMENT UNIT INTEGRATION WITH NAVIGATION DATA FEEDBACK FOR FEATURE TRACKING

(75) Inventors: Yunqian Ma, Plymouth, MN (US); Wesley J. Hawkinson, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 601 days.

(21) Appl. No.: 12/889,728

(22) Filed: Sep. 24, 2010

(65) Prior Publication Data

US 2012/0078510 A1    Mar. 29, 2012

(51) Int. Cl.
*G01C 21/10*    (2006.01)

(52) U.S. Cl.
USPC .............. 701/426; 701/480; 701/500; 353/28; 353/30; 345/633

(58) Field of Classification Search
USPC ......... 701/426, 500, 410, 425, 221, 523, 472, 701/408, 479–489, 468–469; 382/103–104; 348/143, 148; 702/85; 353/28, 30; 345/633
See application file for complete search history.

(56) References Cited

U.S. PATENT DOCUMENTS

| 5,193,124 | A | * | 3/1993 | Subbarao | 382/255 |
|---|---|---|---|---|---|
| 5,231,443 | A | * | 7/1993 | Subbarao | 396/93 |
| 6,094,215 | A | | 7/2000 | Sundahl et al. | |
| 6,535,114 | B1 | | 3/2003 | Suzuki et al. | |
| 7,583,275 | B2 | | 9/2009 | Neumann et al. | |
| 8,155,870 | B2 | * | 4/2012 | Madsen et al. | 701/468 |
| 8,229,166 | B2 | * | 7/2012 | Teng et al. | 382/103 |
| 8,275,193 | B2 | * | 9/2012 | Lin | 382/154 |
| 8,467,133 | B2 | * | 6/2013 | Miller | 359/630 |
| 8,532,367 | B2 | * | 9/2013 | Kaganovich | 382/154 |
| 2007/0288141 | A1 | * | 12/2007 | Bergen et al. | 701/38 |
| 2009/0087029 | A1 | * | 4/2009 | Coleman et al. | 382/103 |
| 2009/0319170 | A1 | * | 12/2009 | Madsen et al. | 701/200 |
| 2011/0218733 | A1 | * | 9/2011 | Hamza et al. | 701/213 |
| 2012/0078510 | A1 | * | 3/2012 | Ma et al. | 701/426 |
| 2012/0154591 | A1 | * | 6/2012 | Baur et al. | 348/148 |

(Continued)

FOREIGN PATENT DOCUMENTS

DE    69022143 E  * 10/1995
EP       408224 A  *  1/1991

OTHER PUBLICATIONS

An evaluation of the Tight Optical Integration (TOI) algorithm sensitivity to inertial and camera errors; Bhattacharya, S. et al., Position, Location and Navigation Symposium, 2008 IEEE/ION; Digital Object Identifier: 10.1109/PLANS.2008.4570061 Publication Year: 2008 , pp. 533-540.*

(Continued)

*Primary Examiner* — Cuong H Nguyen
(74) *Attorney, Agent, or Firm* — Fogg & Powers LLC

(57) ABSTRACT

A navigation device is provided herein comprising an inertial measurement unit (IMU), a camera, and a processor. The IMU provides an inertial measurement to the processor and the camera provides at least one image frame to the processor. The processor is configured to determine navigation data based on the inertial measurement and the at least one image frame, wherein at least one feature is extracted from the at least one image frame based on the navigation data.

12 Claims, 3 Drawing Sheets

(56) References Cited

U.S. PATENT DOCUMENTS

| | | | |
|---|---|---|---|
| 2012/0200601 A1* | 8/2012 | Osterhout et al. | 345/633 |
| 2012/0212484 A1* | 8/2012 | Haddick et al. | 345/419 |
| 2012/0235900 A1* | 9/2012 | Border et al. | 345/156 |
| 2012/0242698 A1* | 9/2012 | Haddick et al. | 345/633 |
| 2012/0249797 A1* | 10/2012 | Haddick et al. | 348/158 |
| 2013/0127980 A1* | 5/2013 | Haddick et al. | 348/14.08 |
| 2013/0278631 A1* | 10/2013 | Border et al. | 345/633 |

OTHER PUBLICATIONS

Ten-fold Improvement in Visual Odometry Using Landmark Matching; Zhiwei Zhu et al., Computer Vision, 2007. ICCV 2007. IEEE 11th International Conference on; Digital Object Identifier: 10.1109/ICCV.2007.4409062; Publication Year: 2007, pp. 1-8.*

Integration of GPS and vision measurements for navigation in GPS challenged environments; Soloviev, Andrey et al., Position Location and Navigation Symposium (PLANS), 2010 IEEE/ION; Digital Object Identifier: 10.1109/PLANS.2010.5507322 Publication Year: 2010, pp. 826-833.*

An Inertial Sensor for Mechanical Compensation of the Vehicle Vertical Movement Impact on In-Vehicle Embedded Camera Orientation; Zayed, M. et al.; Intelligent Transportation Systems Conference, 2007. ITSC 2007. IEEE; Transportation; Digital Object Identifier: 10.1109/ITSC.2007.4357675; Publication Year: 2007, pp. 454-460.*

Deformable structure from motion by fusing visual and inertial measurement data; Giannarou, S.; Zhiqiang Zhang; Guang-Zhong Yang; Intelligent Robots and Systems (IROS), 2012 IEEE/RSJ International Conference on; Digital Object Identifier: 10.1109/IROS.2012.6385671; Publication Year: 2012, pp. 4816-4821.*

Seamless aiding of inertial-slam using Visual Directional Constraints from a monocular vision; Qayyum, U.; Jonghyuk Kim Intelligent Robots and Systems (IROS), 2012 IEEE/RSJ International Conference on; Digital Object Identifier: 10.1109/IROS.2012.6385830; Publication Year: 2012, pp. 4205-4210.*

Vision-aided inertial navigation: Closed-form determination of absolute scale, speed and attitude; Martinelli, A.; Troiani, C.; Renzaglia, A.; Intelligent Robots and Systems (IROS), 2011 IEEE/RSJ International Conference on; Digital Object Identifier: 10.1109/IROS.2011.6094541; Publication Year: 2011, pp. 2460-2465.*

Visual navigation with a time-independent varying reference; Cherubini, A.; Chaumette, F.; Intelligent Robots and Systems, 2009. IROS 2009. IEEE/RSJ International Conference on; Digital Object Identifier: 10.1109/IROS.2009.5354284; Publication Year: 2009, pp. 5968-5973.*

Azarbayejani, A. et al., "Recursive Estimation of Motion, Structure, and Focal Length", "IEEE Transactions on Pattern Analysis and Machine Intelligence", Jun. 1995, pp. 562-575, vol. 17, No. 6, Publisher: IEEE.

Hafskjold et al., "Integrated Camera-Based Navigation", "The Journal of Navigation", May 2000, vol. 53, No. 2, Publisher: Cambridge University Press.

Hol et al., "Sensor Fusion for Augmented Reality", "9th International Conference on Information Fusion 2006", Jul. 10-13, 2006, Publisher: IEEE.

Hwangbo et al., "Inertial-Aided KLT Feature Tracking for a Moving Camera", "IEEE/RSJ International Conference on Intelligent Robots and Systems 2009", Oct. 11-15, 2009, Publisher: IEEE.

Nutzi et al., "Fusion of IMU and Vision for Absolute Scale Estimation in Monocular SLAM", "International Conference on Unmanned Aerial Vehicles", 2010, Published in: Dubai.

Tardif et al., "Monocular Visual Odometry in Urban Environments Using an Omnidirectional Camera", "IEEE/RSJ International Conference on Intelligent Robots and Systems 2008", Sep. 22-26, 2008, pp. 2531-2538, Publisher: IEEE.

* cited by examiner

CAMERA AND INERTIAL MEASUREMENT UNIT INTEGRATION WITH NAVIGATION DATA FEEDBACK FOR FEATURE TRACKING

BACKGROUND

Navigation devices are often prone to error, especially those with light weight or low cost inertial sensors. A navigation solution (for example, position, velocity, and attitude) that is based only on low cost inertial sensors may quickly develop large errors and be unusable in a short time. Therefore, inertial measurement units (IMUs) often are combined with a secondary sensor, such as a camera, a light detection and ranging (LIDAR) sensor, a Doppler velocity sensor, or the like. The secondary sensor provides additional, redundant navigation information which can reduce errors in the navigation solution and aid the IMU. Typically, the IMU and the secondary sensor perform separately and independently. This results in high processing demands as well as the presence of uncorrected errors in the navigation solution.

SUMMARY

One embodiment described herein provides a navigation device that comprises an inertial measurement unit (IMU), a camera, and a processor. The IMU provides an inertial measurement to the processor and the camera provides at least one image frame to the processor. The processor is configured to determine navigation data based on the inertial measurement and the at least one image frame, wherein at least one feature is extracted from the at least one image frame based on the navigation data.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Some embodiments described herein provide a navigation device having an inertial measurement unit integrated with a monocular camera. Once the monocular camera has been calibrated, features are extracted from a captured image frame and tracked through future images frames. Navigation data for the navigation device is calculated using both inertial measurements from the IMU and positions of the extracted features in the image frames. Embodiments herein track extracted features between image frames based on feedback from the navigation data. That is, an expected location of the feature in a current image frame is determined from the location of the feature in a previous frame as well as the predicted location of the navigation device based on the inertial measurements.

Figure 1:
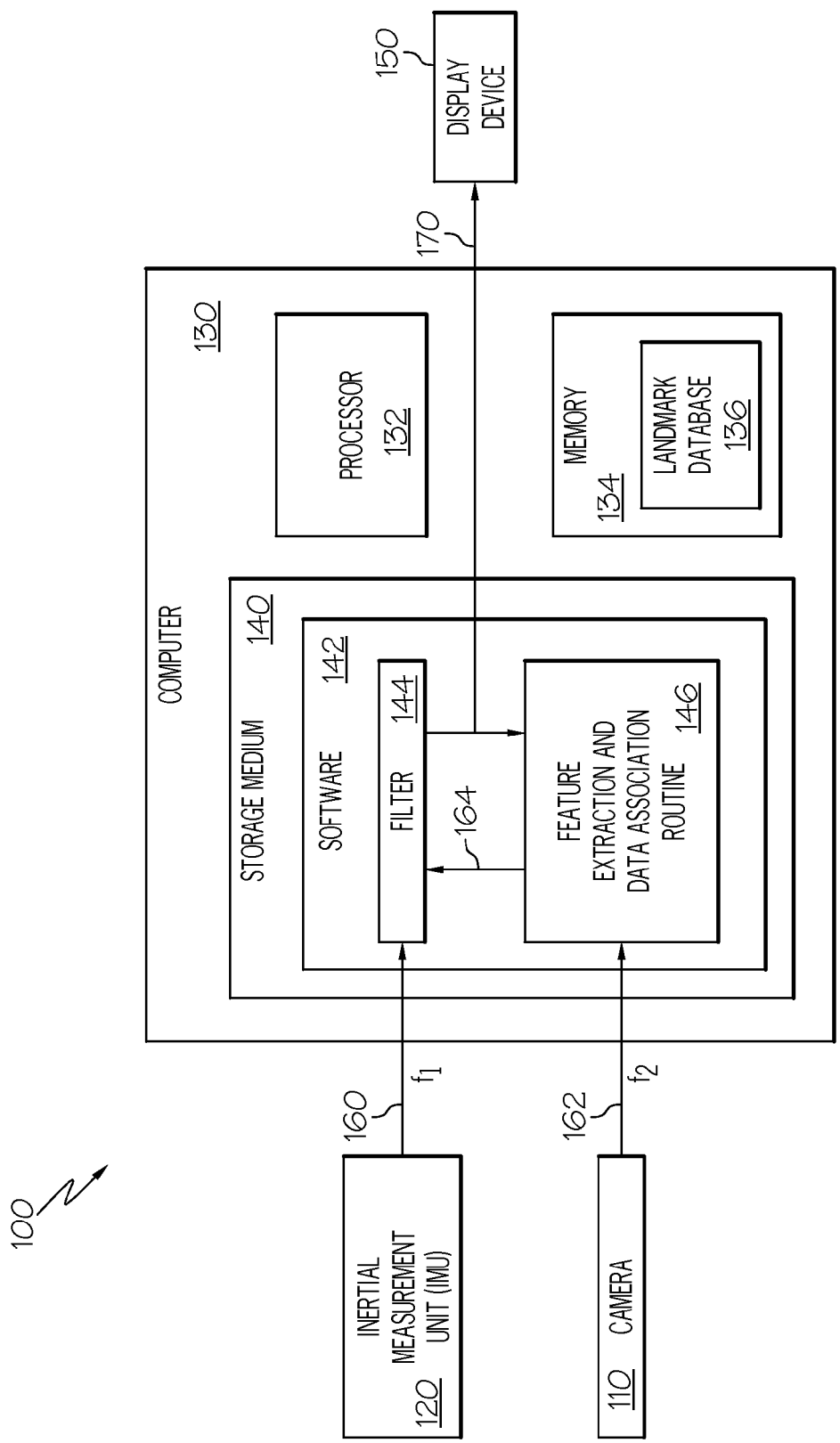
FIG. 1 is a block diagram of one embodiment of a navigation device that comprises a camera integrated with an inertial measurement unit.

FIG. 1 is a block diagram of one embodiment of a navigation device 100 that comprises a camera 110 integrated with an inertial measurement unit (IMU) 120. The IMU 120 and the camera 110 are coupled to a computer 130. The navigation device 100 outputs navigation data 170 that includes state estimates of position, velocity, and attitude of the navigation device 100. The navigation device 100 is used for any navigation application, including, but not limited to, personal navigation, vehicle navigation, and robot navigation. In one embodiment, the navigation device 100 is mounted on an unpiloted or unmanned aerial vehicle (UAV). In some embodiments, the navigation device 100 is a handheld device.

The IMU 120 is a sensor device that provides inertial measurements 160 to the computer 130. The inertial measurements 160 provide angular rate of change and acceleration information that are related to the displacement and orientation of the navigation device 100. The inertial measurements 160 are measured and provided to the computer 130 at a first frequency ($f_1$), for example, anywhere from approximately 100 Hertz (Hz) to approximately 600 Hz or higher. However, in other implementations of the navigation device 100, inertial measurements 160 are measured or provided to the computer 130 at other rates. In some embodiments, the IMU 120 comprises one or more instruments or sensors for monitoring (or otherwise generating signals or information indicative of) angular position, acceleration, calibration and the like. In one embodiment, the IMU 120 comprises at least one gyroscope and at least one accelerometer. In another embodiment, the IMU 120 comprises three gyroscopes and three accelerometers that measure angular rate and acceleration in three mutually orthogonal directions, respectively. In some embodiments, IMU 120 is implemented using a relatively low quality, inexpensive inertial measurement unit that is subject to at least drift errors. For example, where the quality of an IMU is represented as an error measured in degrees per hour, a relatively low quality IMU would have an expected error on the order of magnitude of 10 degrees per hour or greater.

The camera 110 provides image frames 162 of the surrounding environment of the navigation device 100 to the computer 130. The camera 110 has a field of view (FOV) and a focal length (f). In one embodiment, the camera 110 is a monocular camera. A monocular camera produces a two dimensional (2D) image frame and is a bearing only sensor, meaning it does not provide range information for any object within an image frame. Embodiments of the camera 110 include cameras that are sensitive to the visual, infrared, or any other portion of the electromagnetic spectrum. New image frames 162 are provided to the computer 130 at a second frequency ($f_2$). In some embodiments, the second frequency for image frame updates or captures is lower than the first frequency for inertial measurement 160 updates. For example, the camera 110 captures a new image frame 162 and provides it to the computer 130 at a frequency of approximately 1 frame/sec (1 Hz). However, other frequencies are contemplated.

Some embodiments of the camera 110 provide a 360 degree FOV. For example, one embodiment of the camera 110 is an omnidirectional camera. Another embodiment of the camera 110 is an array of cameras concatenated together to achieve a wider FOV than would be achieved with only one of the cameras that make up the array. For example, an array of cameras includes a plurality of cameras whose combined FOV is 360 degrees. In one embodiment, part of the FOV of each camera overlaps partially with a FOV of one or more other cameras in the array. One example of an array of cameras is a Ladybug 2 camera, available from Point Grey Research, Inc., that employs six 2.5 mm focal length (f) cameras positioned in an approximate circle to provide a 360 degree FOV. Each camera in a camera array can be treated as a unique traditional camera with a limited FOV. The array of cameras 110 each generate a sub-image, wherein the at least one feature is tracked between at least two of the sub-image as the navigation device 100 moves.

The computer 130 comprises a processor 132 that is used to implement a feature extraction and data association routine 146 and a filter 144. In the embodiment shown in FIG. 1, the feature extraction and data association routine 146 and filter 144 are implemented in software 142 that is executed by the processor 132. The processor 132 can be implemented using devices such as, but not limited to, a field programmable array (FPGA) chip, an application specific integrated circuit (ASIC), or a microprocessor, for example. The software 142 comprise program instructions that are stored on a suitable storage device or medium 140. Suitable storage devices or media 140 include, for example, forms of non-volatile memory, including by way of example, semiconductor memory devices (such as Erasable Programmable Read-Only Memory (EPROM), Electrically Erasable Programmable Read-Only Memory (EEPROM), and flash memory devices), magnetic disks (such as local hard disks and removable disks), and optical disks (such as Compact Disk-Read Only Memory (CD-ROM) disks). Moreover, the storage device or media 140 need not be local to the navigation device 100. Typically, a portion of the software 142 executed by the processor 132 and one or more data structures used by the software 142 during execution are stored in a memory 134. Memory 134 comprises, in one implementation of such an embodiment, any suitable form of random access memory (RAM) now known or later developed, such as dynamic random access memory (DRAM). In other embodiments, other types of memory are used. The components of the computer 130 are communicatively coupled to one another as needed using suitable interfaces and interconnects.

The computer 130 receives the image frames 162 from the camera 110, wherein the processor 132 detects one or more features in the image frames 162. The feature extraction and data association routine 146 extracts features (also referred to herein as landmarks) from the one or more image frames 162. For example, features such as point features, line features, and plane features are detected in an image frame 162. As would be appreciated by one of ordinary skill in the art upon reading this specification, there are feature extraction techniques known in the art are used to extract features from an image frame, including, for example, the feature point algorithms and corner detection algorithms provided by Harris & Stephans, Plessy, or the scale invariant feature transform (SIFT), where each feature has a 3D location corresponding to the 2D projection on the image plane of the camera 110. However, embodiments of the present invention are not limited to these algorithms and other feature extraction routines are contemplated for use for routine 146. Feature data 164 is provided to the filter 144.

Features extracted from a first frame by the feature extraction and data association routine 146 are stored in a landmark database 136. In one embodiment, only features that are extracted from a first frame and a second frame are stored in the landmark database 136. In another embodiment, the landmark database 136 stores features and landmarks detected during runtime. In yet another embodiment, when a feature is detected within the FOV of the camera 110, it is added to the landmark database 136. In another embodiment, a feature is deleted from the landmark database 136 when it is no longer detected within the FOV of the camera 110. Embodiments of the navigation device 100 having a camera 110 with a wider FOV reduce the number of additions and deletions of features saved in the landmark database 136 over narrower FOV embodiments because the larger FOV results in more image frames detecting each feature. That is, the wider the FOV, the less features will have to be added and deleted from the landmark database 136. For example, as the navigation device 100 approaches a landmark, the feature extraction and data association routine 146 detects a feature that is saved in the landmark database 136. When the navigation device 100 moves past the landmark, the camera 110 would lose sight of the landmark sooner if it had a limited FOV than if it had a 360 degree FOV. In one embodiment, the landmark database 136 is stored in memory 134. In another embodiment, the landmark database 136 is stored in storage medium 142.

The computer 130 receives the inertial measurements 160 from the IMU 120. The processor 132 filters the inertial measurements 160 and the feature data 164 using filter 144 to determine the navigation data 170. Implementations of the filter 144 include an extended Kalman filter (EKF), a hybrid extended Kalman filter, a variable state dimension filter, an unscented Kalman filter, or any other recursive filter. The filter 144 integrates the inertial measurements 160 and the feature data 164 to estimate at least the position, velocity, and attitude of the navigation device 100.

The navigation data 170 is fed back to the feature extraction and data associate routine 146. The feature extraction and data associate routine 146 tracks features detected in a first image frame captured at a first location to a second image frame captured at a second location. In this coupled system, positions associated with the features are identified and the estimate of where those features will be in the next, subsequent image frame is based on the output of the filter 144. That is, the position of a landmark is coupled to the navigation solution.

In the embodiment shown in FIG. 1, the navigation data 170 is displayed for a user on a display device 150. The display device 150 comprises any device that conveys information, including a display screen such as a liquid crystal display (LCD) screen, or an auditory display such as a speaker. Other embodiments of the navigation device 100 do not include the display device 150. Some embodiments of the navigation device 100 output the navigation data 170 to an external device. In another embodiment, the navigation device 100 comprises a power source, such as a battery. In one embodiment, both the IMU 120 and the camera 110 are passive sensors and are immune to disruptions in the radio spectrum. In another embodiment, the navigation device 100 comprises an odometer and a gyroscope instead of the IMU 120.

Figure 2:
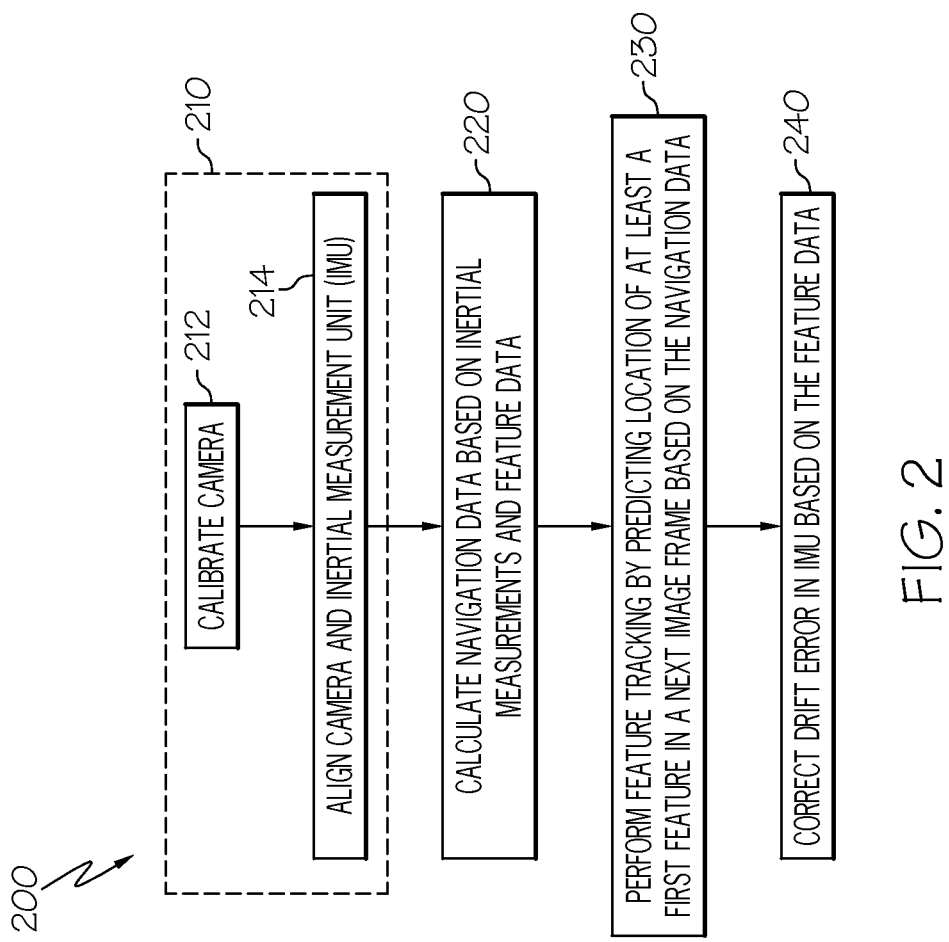
FIG. 2 is a flowchart of one embodiment of a method for integrating a monocular camera and an inertial measurement unit.

FIG. 2 is a flowchart of one embodiment of a method 200 for integrating a monocular camera and an inertial measurement unit. The method begins with calibrating the camera 110 and the IMU 120 (block 210). In the embodiment shown in FIG. 2, calibrating the camera 110 and the IMU 120 comprises calibrating the camera 110 (block 212) and aligning the camera 110 and the IMU 120 (block 214). When the navigation device 100 is first powered on, if there are no features pre-stored in the landmark database 136, the camera is initialized to detect at least a first feature (block 212). In one embodiment, calibrating the camera 110 comprises a self-calibrating step that recovers intrinsic parameters of the camera 110. This calibration of the intrinsic parameters builds a relationship between a 3D location of a feature with a 2D image coordinate of the feature. In one implementation, the camera 110 performs a sequence of image frames assuming a constant focal length. The processor 132 calculates a projective reconstruction matrix between the 3D location of the feature and the 2D image coordinate.

Figure 3:
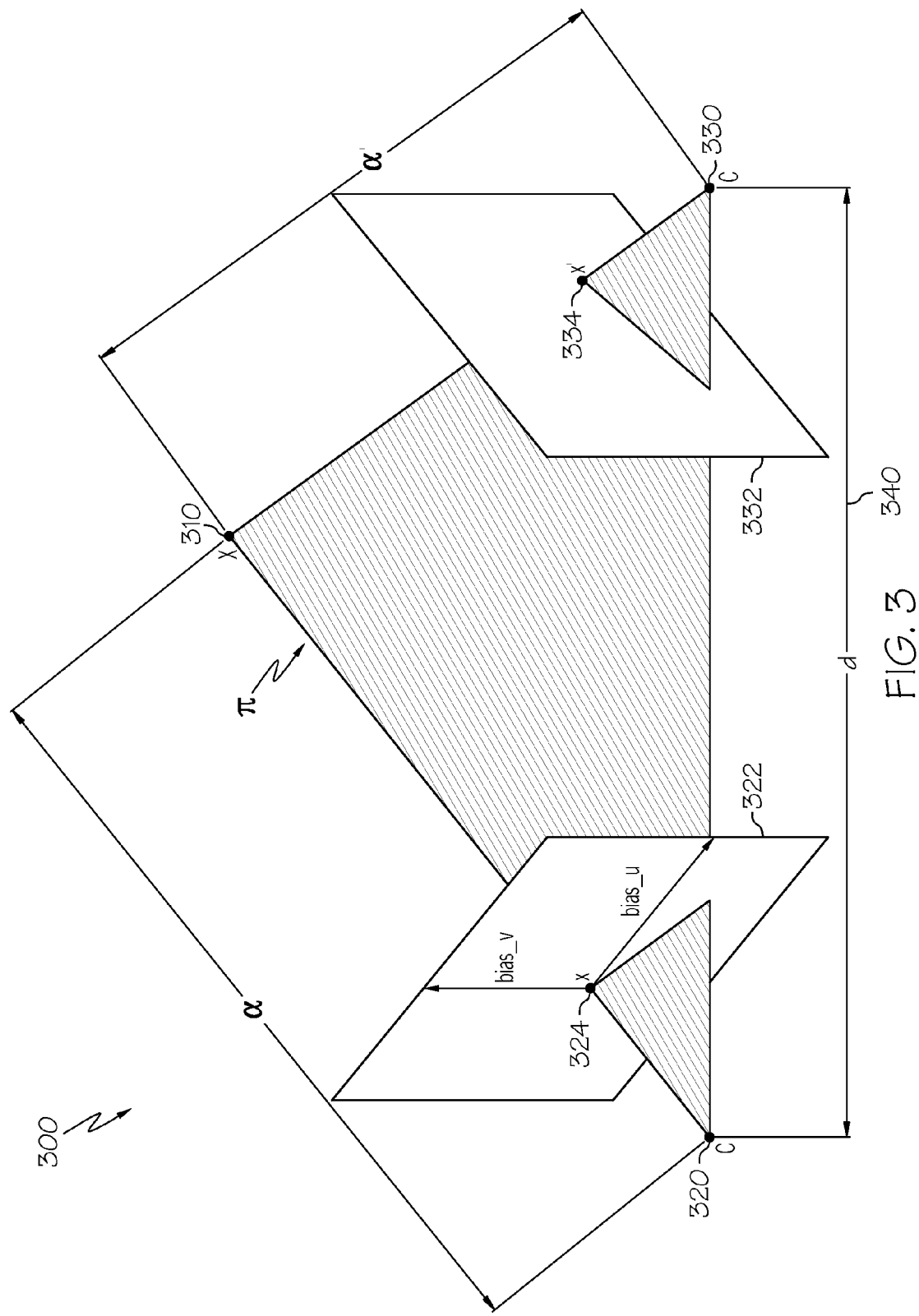
FIG. 3 is a diagram of one embodiment of a feature as detected in a first image frame captured at a first location and at a second image frame captured at a second location.

As both the camera 110 and the IMU 120 are mounted on the moving navigation device 100, when a first feature appearing in a first image frame reappears in a second image frame as the navigation device 100 moves, the processor 132 uses a rotation and translation of the body frame for the camera 110 data 162 and calculates a position displacement using a strapdown navigation solution from the inertial measurements 160. This coupling of the camera 110 and the IMU 120 is applied using one or more features between two different physical positions of the moving navigation device 100 (referred to herein as "points"). For example, the first feature is extracted from a first image frame at a first point and from a second image at a second point. This provides a temporal alignment between the IMU 120 and the camera 110 that indexes them together to allow a common synchronization (block 214). FIG. 3 illustrates the geometric relationship between a feature and its appearance in an image frame.

FIG. 3 is a diagram 300 of one embodiment of a feature 310 as detected in a first image frame 322 captured at a first location 320 and at a second image frame 332 captured at a second location 330. At a first time ($t_1$), the camera 110 is at the first location (c) 320 and is directed at feature (X) 310 located a range distance ($\alpha$) away when the camera 110 captures image frame 322. The feature X 310 projected on the 2D image frame 322, (x) 324, is at a position represented with 2D coordinates, $u_0$ and $v_0$, respectively. In the first frame, where $u_0$ and $v_0$ are available, the feature X 310 is represented as (bias_u, bias_v, $\alpha$). The bias_u is relative to $u_0$, and the bias_v is relative to $v_0$.

At a second time ($t_2$), the camera 110 has been rotated by a view angle and displaced a distance (d) 340 to be at a second location (c') 330. The feature X 310 is still within the FOV of the camera 110 at location 330. Thus, image frame 332 contains a representation (x') 334 of feature X 310 at bias_u' and bias_v'. The distance (d) 340 is known from the IMU 120. Based on the parallax of feature X 310 due to the camera's 110 displacement by a distance 340 of "d," the location of feature X 310 is determined. In one embodiment, the range ($\alpha$) is arbitrarily or randomly set to a particular value. When the range ($\alpha$) of a landmark is held constant between two image frames, a change in the position of the feature between the image frames based on the apparent angle provides the position of the camera 110. That is, for every new landmark or feature that appears in the FOV of the camera 110, the position of the camera 110 is calculated from the change in position of the feature due to the camera movement in 3D given by the IMU 120 using triangulation.

Using a perspective projection model, the relationship between the 3D location of a feature and the 2D image frame coordinates (u, v) becomes:

$$x = (1+\alpha/f)u \quad (1)$$

$$y = (1+\alpha/f)v \quad (2)$$

$$z = \alpha \quad (3)$$

These equations are valid when the feature X 310 is identified in the first image frame 322 and the measurements on a subsequent image frame 332 are approximately near a zero-mean. However, bias elements (bias_u, bias_v) can be added to the 2D coordinates (u, v) so the relationship between the 3D location of feature X 310 and the 2D image coordinates (u, v) becomes:

$$x = \left(1 + \frac{\alpha}{f}\right)(u + \text{bias\_u}) \quad (4)$$

$$y = \left(1 + \frac{\alpha}{f}\right)(v + \text{bias\_v}) \quad (5)$$

The measured camera 110 bias elements (bias_u, bias_v) and range ($\alpha$) are used to uniquely represent the feature X 310 in frame 322 (which can be any selected landmark). Therefore, a feature point in a static vector is defined as (bias_u, bias_v, $\alpha$) to represent a landmark. This feature data 164 is included in the states of the filter 144. Besides the feature data 164, the states in the filter 144 also include the navigation solution (P, V, and A) and the camera 110 model (that is, the focal length of the camera 110), so the filter states can be dynamically estimated. In one embodiment, the 3D coordinate of feature X 310 using the camera 110 coordinate system is translated into a rotation matrix multiple of 3D coordinates of a fixed global coordinate system (for example, from a global navigation satellite system). In one embodiment, these coordinates are saved in the landmark database 136. In such an implementation, the rotation matrix is updated real-time and online using the angular velocity measurement from the IMU 120. In one embodiment, the range is achieved through reducing a reprojection error. The feature extraction and data association routine 146 outputs the feature data 164, which is an estimate of position and attitude change of the camera1 110 based on the location of at least one feature in an image frame.

Returning to FIG. 2, once the navigation device 100 is calibrated, the navigation data 170 is calculated based on the inertial measurements 160 and the feature data 164 (block 220). In one embodiment, calculating the navigation data 170 comprises determining the feature data 164 and then applying a hybrid extended Kalman filter (EKF) to the inertial measurements 160 and the feature data 164. The hybrid EKF has the initial states of the position, velocity, and attitude of the new device 100 upon which an initial inertial sensor bias is added (gyro bias and acceleration bias). A camera image bias is then added to the inertial navigation states (position, velocity, and attitude) and the inertial sensor bias.

The hybrid EKF comprises state vectors and observation vectors. The state vectors include the position, velocity, and attitude of the moving navigation device 100, representations of the tracked features in the landmark database 136, and the focal length f of the camera 110. The observation vectors come from the measurements of the IMU 120 and the camera 110. Embodiments of the motion states of the navigation device 100 (referred to as a measurement model) are modeled with a random walk model, however other embodiments use other models. In one embodiment, the measurement model includes non-linear functions of the state vectors.

There are five steps in the hybrid extended Kalman filter that tightly couple the camera 110 as an aid to the IMU 120 and, similarly, the IMU 120 as an aid to the camera 110. The five steps comprise (1) a state estimate integration, (2) a covariance estimate integration, (3) a gain computation, (4) a state estimate update, and (5) a covariance estimate update. The state estimate and covariance estimate integrations (steps 1 and 2) are performed at a frequency lower than, or, alternatively, at a frequency synchronized with, the frequency ($f_1$) of the IMU 120. The gain computation, state estimate update, and covariance estimate update (steps 3 through 5) are updated at the same or a relatively lower frequency than the state and covariance estimates (for example, at a frequency synchronized with the frequency ($f_2$) of the camera 110). In one embodiment, the focal length (f) of the camera 110 is inputted as a state of the hybrid EKF. Embodiments described herein provide discrete-time gain updates and measurement updates. The processor 132 runs the feature data 162 and the inertial measurements 160 through the filter 144, a hybrid EKF, to determine the navigation data 170. In one embodiment, a Jacobian matrix of the feature data 162 and the inertial measurements 160 is calculated to implement the hybrid EFK.

Feature tracking is performed by predicting the location of at least a first feature in a next image frame based on the navigation data 170 (block 230). That is, the navigation data 170 is fed back into the feature extraction and data association routine 146 as an aid to detect the presence of a feature in a future image frame. The navigation data 170 narrows the search required to find the feature, since an approximate location of the feature in the next image frame is determined from the navigation data 170. This results in a tight coupling of the IMU 120 and the camera 110, while reducing processing requirements. Features are tracked between image frames using feature tracking methods that would be known to those of ordinary skill in the art and for that reason not further described herein. Such feature tracking methods would include, but are not limited to, the Lucas-Kanade method. Because the motion of the navigation device 100 is known, the Lucas-Kanade method is narrowed to searching for the feature in a neighborhood of the estimated 2D location of the feature.

Concurrently, errors in the IMU 120 are corrected for using the feature data 164 (block 240). For example, the camera 110 captures an image frame that shows the camera 110 is located at a certain position based on the position of a feature in the image frame. This calculated position is used to correct drift errors in the IMU 120. In one embodiment, the states of the hybrid EKF are reset. Resetting the hybrid EKF reduces drift errors in the IMU 120 that have been accumulating as the navigation device 100 moves. In one embodiment, a reset is a weighted average of the measurements of the camera 110 and the preexisting filter states. In one implementation, by setting a measurement noise covariance, the camera 110 measurements are weighted at 80% and the strapdown navigation solution from the inertial measurements 160 and the IMU 120 are weighted at 20%. In other embodiment, other weighted averages are used.

As described above, the inertial measurements 160 and the feature data 164 are complimentary. The camera 110 reduces the drift of the inertial measurement unit 120 and, complimentarily, the inertial measurements 160 compensate an incorrect image feature points tracking and model errors of the camera 110. If there are no features in a particular image frame, there is no feature data 164 provided to the filter 144. The hybrid EFK does not reset, and the navigation data 170 that it outputs is based solely on the inertial measurements 160. Examples when there is no feature data 164 include a featureless image (such as an image of a clear sky). When the navigation device 100 moves straight toward a feature, the feature extraction and data association routine 146 cannot determine an angle of the feature moving between two image frames. In such a situation, either another feature is used in the image frames or no feature data 164 is provided to the filter 144.

Some embodiments herein described a high frequency inertial measurement path where a position, velocity, and attitude of a navigation device is calculated and is updated with a low frequency feature data path to calculate navigation data. The motion of features are tracked between image frames captured by a camera integrated with an inertial measurement unit. A set of features in a first image frame are correlated in a second image frame. A feedback path of the outputted navigation data is provided to the feature extraction routine. In one embodiment the feedback is done in an open loop, wherein the navigation device starts with zero knowledge of the previous frame or the navigation state (if the position of the navigation device has changed) and the feedback narrows the search during data association.

In one embodiment, a method of navigation is provided by fusing inertial measurement from a low cost inertial sensor and monocular camera measurement. The integrated monocular camera and inertial sensor is usable in any application, including where a global positioning system (GPS) or other GNSS is not available. Some embodiments of the IMU and monocular camera are very small and light. Other embodiments use inexpensive inertial measurement units, which reduces the cost of the navigation device.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A navigation device, comprising:
    a monocular camera configured to capture image frames at discrete time intervals;
    an inertial measurement unit configured to measure angular rate and acceleration; and
    a processor coupled to the monocular camera and the inertial measurement unit, wherein the processor is configured to execute software, wherein the software comprises a feature extraction and data association functionality and a filter functionality that:
        tracks one or more features from a first image frame captured at a first location and from a second image frame captured at a second location;
        determines a physical displacement of the navigation device based on the measured angular rate and acceleration;
        determines a position correction based on the relative movement of the one or more features between the first image frame and the second image frame
    wherein the processor determines the position correction by calculating a set of 3D coordinates of the one or more features and stores the set of 3D coordinates in a landmark database, wherein the filter functionality comprises a hybrid extended Kalman filter having state vectors including position, velocity, and attitude, representations of tracked features in the landmark database, and a focal length f of the at least one monocular camera; and outputs navigation data based on the physical displacement and the position correction; and wherein feedback from the navigation data is used for tracking the one or more features.

2. The navigation device of claim 1, further comprising:
a display device that displays the navigation data; and
a storage medium containing the landmark database, wherein feature data relating to the at least one feature and other extracted features are stored when detected in the first image frame and deleted when no longer detected in the second image frame;

wherein the monocular camera comprises a plurality of monocular cameras arrayed together such that the plurality of monocular cameras output a combined field of view that is greater than the field of view of any of the individual monocular cameras.

3. The navigation device of claim 1, wherein the measured angular rate and acceleration are compensated for based on the position correction.

4. The navigation device of claim 1, wherein the feature extraction and data association functionality executed by the processor determines an approximate location of the one or more features within the second image frame based on the angular rate and acceleration.

5. A camera aided inertial navigation system, comprising:
at least one monocular camera that captures at least a first image frame;
an inertial measurement unit integrated with the at least one monocular camera, wherein the inertial measurement unit takes inertial measurements; and
a processor coupled to the at least one monocular camera and the inertial measurement unit, wherein the processor determines a position of at least one feature in the first image frame based on an output from processing the inertial measurements with a previous position of the at least one feature;

wherein the processor determines a set of 3D coordinates of the at least one feature from a 2D image frame that captures the at least one feature and stores the set of 3D coordinates in a landmark database; and wherein the processor executes a hybrid extended Kalman filter having state vectors including position, velocity, and attitude, representations of tracked features in the landmark database, and a focal length f of the at least one monocular camera.

6. The system of claim 5, wherein:
the inertial measurement unit takes inertial measurements at a first frequency; and
the at least one monocular camera captures images at a second frequency, wherein the second frequency is lower than the first frequency.

7. The system of claim 6, wherein the hybrid extended Kalman filter filters the inertial measurements and the previous position of the at least one feature.

8. The system of claim 7, wherein:
the hybrid extended Kalman filter determines a state estimate and covariance estimate based on the inertial measurements, wherein the state estimate and covariance estimate are determined at the second frequency; and
the hybrid extended Kalman filter determines a gain computation, a state estimate update, and a covariance estimate update at discrete times based on the at least one feature.

9. The system of claim 5, wherein the processor is configured to execute software, wherein the software comprises a feature extraction and data association functionality that narrows a search of the at least one feature in a second image frame based on a location of the camera determined from the navigation data.

10. The system of claim 5, wherein the processor further compensates the inertial measurements based on the position of the at least one feature.

11. The system of claim 10, wherein the processor further resets at least one state of a filter based at least on the at least one feature using a weighted average of the inertial measurements and the at least one feature.

12. The system of claim 5, further comprising:
a storage medium containing the landmark database, wherein feature data relating to the at least one feature and other extracted features are stored.

* * * * *